United States Patent
Mukunoki et al.

(10) Patent No.: US 9,960,709 B2
(45) Date of Patent: May 1, 2018

(54) POWER CONVERSION DEVICE

(71) Applicants: Mitsubishi Electric Corporation, Chiyoda-ku (JP); TOSHIBA MITSUBISHI-ELECTRIC INDUSTRIAL SYSTEMS CORPORATION, Chuo-Ku (JP)

(72) Inventors: Kaho Mukunoki, Chiyoda-ku (JP); Toshiyuki Fujii, Chiyoda-ku (JP); Ryosuke Uda, Chiyoda-ku (JP); Taichiro Tsuchiya, Chuo-Ku (JP); Akihiro Matsuda, Chuo-Ku (JP); Hisanori Taguchi, Chuo-Ku (JP)

(73) Assignees: Mitsubishi Electric Corporation, Chiyoda-ku (JP); TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 0 days. days.

(21) Appl. No.: 15/549,330

(22) PCT Filed: Mar. 7, 2016

(86) PCT No.: PCT/JP2016/057021
§ 371 (c)(1),
(2) Date: Aug. 7, 2017

(87) PCT Pub. No.: WO2016/147935
PCT Pub. Date: Sep. 22, 2016

(65) Prior Publication Data
US 2018/0069488 A1 Mar. 8, 2018

(30) Foreign Application Priority Data
Mar. 17, 2015 (JP) .................................. 2015-052959

(51) Int. Cl.
*H02M 7/217* (2006.01)
*H02M 7/487* (2007.01)
*H02M 7/483* (2007.01)

(52) U.S. Cl.
CPC .... *H02M 7/487* (2013.01); *H02M 2007/4835* (2013.01)

(58) Field of Classification Search
CPC .......... H02M 1/4208; H02M 7/53871; H02M 1/081; H02M 1/084; H02M 1/0845;
(Continued)

(56) References Cited

U.S. PATENT DOCUMENTS 5,892,674 A * 4/1999 Shimada ............... H02M 7/219
363/127
9,564,827 B2 * 2/2017 Mukunoki ............ H02M 7/483
(Continued)

FOREIGN PATENT DOCUMENTS

| JP | 2011-182517 A | 9/2011 |
|---|---|---|
| JP | 2012-44839 A | 3/2012 |
| WO | 2015/104922 A1 | 7/2015 |

OTHER PUBLICATIONS

International Search Report dated May 17, 2016, in PCT/JP2016/057021 filed Mar. 7, 2016.

*Primary Examiner* — Adolf Berhane
(74) *Attorney, Agent, or Firm* — Oblon, McClelland, Maier & Neustadt, L.L.P.

(57) ABSTRACT

A power conversion device includes: a positive arm and a negative arm each of which is formed by connecting a plurality of converter cells in series, the converter cells each being composed of a plurality of semiconductor switching elements and a DC capacitor; and a control circuit. An arm balance control unit in the control circuit calculates a first voltage adjustment value for balancing voltage of the DC capacitors in the positive arm and voltage of the DC capaci-
(Continued)

tors in the negative arm. The control circuit adjusts an AC control command using the first voltage adjustment value, thereby calculating an AC voltage command for AC voltage to be outputted to an AC line for each phase.

18 Claims, 7 Drawing Sheets

(58) Field of Classification Search
CPC .. H02M 7/155; H02M 7/1557; H02M 7/1626; H02M 3/28; H02M 3/33507; H02M 3/33523; H02M 3/538466; H02M 7/48; H02M 7/537; H02M 3/315; H02M 3/3155; H02M 3/335; H02M 7/217; H02M 7/757; G05F 1/30; G05F 1/33; G05F 1/455
USPC .................................. 363/78, 87, 95, 97, 131
See application file for complete search history.

(56) References Cited

U.S. PATENT DOCUMENTS

| | | | | |
|---|---|---|---|---|
| 9,755,542 | B2* | 9/2017 | Fujii | H02M 7/483 |
| 9,780,685 | B2* | 10/2017 | Jimichi | H02M 7/04 |
| 9,806,630 | B2* | 10/2017 | Mukunoki | H02M 1/12 |
| 9,812,992 | B2* | 11/2017 | Mukunoki | H02M 7/68 |
| 2014/0247636 | A1* | 9/2014 | Koyano | H02M 5/297 |
| | | | | 363/148 |
| 2016/0056727 | A1* | 2/2016 | Mukunoki | H02M 7/483 |
| | | | | 363/68 |
| 2016/0294276 | A1* | 10/2016 | Onishi | H02M 1/36 |
| 2016/0329831 | A1* | 11/2016 | Mukunoki | H02M 7/483 |
| 2017/0012521 | A1* | 1/2017 | Jimichi | H02M 7/483 |
| 2017/0047860 | A1* | 2/2017 | Fujii | H02M 7/483 |
| 2017/0214334 | A1* | 7/2017 | Mukunoki | H02M 7/217 |
| 2017/0288569 | A1* | 10/2017 | Uda | H02M 7/23 |

* cited by examiner

POWER CONVERSION DEVICE

TECHNICAL FIELD

The present invention relates to a power conversion device for performing power conversion between a plural-phase AC circuit and a DC circuit, and in particular, relates to a large-capacity power conversion device having a multiplexed converter.

BACKGROUND ART

In large-capacity power conversion devices, the converter output is high voltage or large current, and therefore, many large-capacity power conversion devices are configured with a plurality of converters multiplexed in series or parallel. Multiplexing converters allows not only increase in the converter capacity but also reduction in harmonics contained in an output voltage waveform by combining outputs. It is known that, as a result, it is possible to reduce harmonic current flowing out to a grid.

There are various methods for multiplexing converters, e.g., reactor multiplexing, transformer multiplexing, and direct multiplexing. In the case of transformer multiplexing, since an AC side is isolated by transformers, there is an advantage that common DC current can be used among the transformers. However, there is a disadvantage that, in the case where output voltage is high, the configuration of the multiplexed transformer is complicated and the cost of the transformer increases.

Considering the above, as a power conversion device that is suitable for high-voltage usage and does not require a multiplexed transformer, a multilevel converter is proposed in which outputs of a plurality of converters are connected in cascade. One example of such multilevel converters is a modular multilevel converter (hereinafter, referred to as an MMC).

The MMC is composed of an arm in which a plurality of unit converters called cells (hereinafter, referred to as converter cells) are connected in cascade. Each converter cell includes a plurality of semiconductor switches and a DC capacitor, and through ON/OFF control of the semiconductor switches, outputs both-end voltage of the DC capacitor and zero voltage.

In the case of three-phase MMC, the arm is formed individually for each phase. The arms for the respective phases are connected in parallel to each other, and their connection terminals at both ends, which are connected in parallel to each other, are used as DC terminals. The arm for each phase is formed from a positive arm and a negative arm each of which has converter cells the number of which is half the total number of converter cells connected in cascade. The connection point between the positive arm and the negative arm is used as an AC-side input/output terminal.

Output of each converter cell of the MMC is connected to both sides of an AC end and a DC end of the MMC. Therefore, each converter cell has a feature of performing both DC output and AC output. That is, current flowing through each arm includes an AC component and a DC component. Therefore, in the MMC, these plurality of current components are controlled. Further, in the MMC, a DC capacitor is provided to each converter cell. Therefore, due to variation among voltages of these DC capacitors, imbalance might occur between voltages of the DC capacitors in the positive arm and voltages of the DC capacitors in the negative arm. Therefore, it is necessary to control voltages of the DC capacitors in order to suppress the imbalance.

The MMC which is a conventional power conversion device includes, as means for controlling voltages of the DC capacitors, command value generating means for generating a circulating current command value on the basis of the voltage values of the DC capacitors in a first arm and the voltage values of the DC capacitors in a second arm.

Further, the conventional MMC includes control means for performing control so that circulating current which is half the sum of current flowing through the first arm and current flowing through the second arm follows the circulating current command value. The command value generating means includes fundamental wave component generating means for generating a fundamental wave component, of the circulating current command value, that has the same phase as terminal voltage between the AC-side input/output terminals, using a difference between a value obtained by averaging the voltage values of all the DC capacitors in the first arm, and a value obtained by averaging the voltage values of all the DC capacitors in the second arm. Further, the command value generating means includes DC component generating means for generating a DC component of the circulating current command value, using a value obtained by averaging the voltage values of all the DC capacitors. Thus, the conventional MMC controls voltages of the DC capacitors by causing the circulating current to flow so as to follow the calculated circulating current command value (see, for example, Patent Document 1).

CITATION LIST

Patent Document

Patent Document 1: Japanese Laid-Open Patent Publication No. 2012-44839 (page 2)

SUMMARY OF THE INVENTION

Problems to be Solved by the Invention

In the conventional power conversion device, in order to provide current having the same phase as the terminal voltage between the AC terminals, it is necessary to detect the phase of voltage at the AC terminal for each phase, resulting in increase in the calculation amount. In addition, in the case where the phase of the terminal voltage between the AC terminals sharply changes due to grid failure or the like, the control performance of the voltage control for the DC capacitors is deteriorated, thus causing a problem that voltages of the DC capacitors become overvoltage.

The present invention has been made to solve the above problem, and an object of the present invention is to provide a power conversion device that reduces the calculation amount and prevents overvoltage of the DC capacitors by balancing voltage of the DC capacitors in the positive arm and voltage of the DC capacitors in the negative arm, and that is capable of performing stable operation even in the case of grid abnormality.

Solution to the Problems

A power conversion device according to the present invention includes: a power converter for performing power conversion between three-phase AC and DC, the power converter including a plurality of leg circuits each having a positive arm and a negative arm which are connected in series and are connected to an AC line for each phase, the plurality of leg circuits being connected in parallel between positive and negative DC buses; and a control device for controlling the power converter. Each of the positive arm and the negative arm of each leg circuit includes a converter cell composed of: a series unit including a plurality of semiconductor switching elements connected in series to each other; and a DC capacitor connected in parallel to the series unit. The control device includes a voltage command generation unit for generating a positive arm voltage command for the positive arm and a negative arm voltage command for the negative arm, and performs output control of each converter cell in the positive arm and the negative arm by PWM control. The voltage command generation unit includes: an AC current control unit for calculating an AC control command for controlling an AC current component flowing through the AC line for each phase; an arm balance control unit for, on the basis of positive capacitor voltage which is voltage of the DC capacitor in the positive arm and negative capacitor voltage which is voltage of the DC capacitor in the negative arm, calculating a first voltage adjustment value for balancing the positive capacitor voltage and the negative capacitor voltage; an AC-side command calculation unit for outputting an AC voltage command for AC voltage to be outputted to the AC line for each phase; and a command distributing unit for determining the positive arm voltage command and the negative arm voltage command on the basis of the AC voltage command and a DC voltage command for DC voltage between the DC buses. The AC-side command calculation unit calculates the AC voltage command by adjusting the AC control command using the first voltage adjustment value.

Effect of the Invention

The power conversion device according to the present invention enables reduction in the calculation amount, and can balance voltage of the DC capacitors in the positive arm and voltage of the DC capacitors in the negative arm, thereby preventing overvoltage of the DC capacitors, enabling stable operation even in the case of grid abnormality, and suppressing outflow of harmonics.

DESCRIPTION OF EMBODIMENTS

Embodiment 1

Hereinafter, a power conversion device 100 according to embodiment 1 of the present invention will be described with reference to the drawings.

Figure 1:
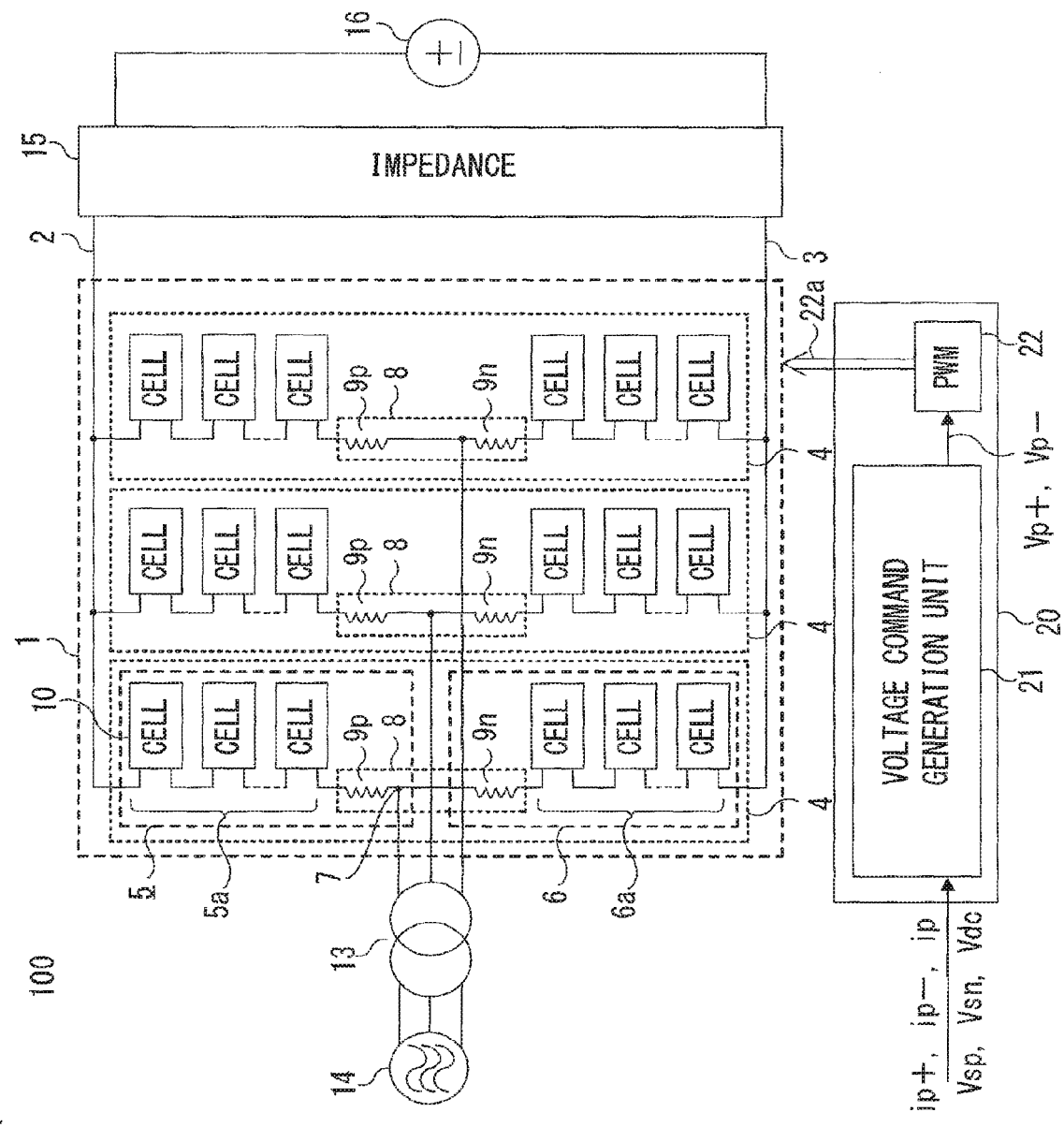
FIG. 1 is a schematic configuration diagram of a power conversion device according to embodiment 1 of the present invention.

FIG. 1 is a schematic configuration diagram of the power conversion device 100 according to embodiment 1 of the present invention.

As shown in FIG. 1, the power conversion device 100 includes a power converter 1 as a main circuit, and a control device 20 for controlling the power converter 1. The power converter 1 performs power conversion between three-phase AC and DC. The AC side of the power converter 1 is connected via an interconnection transformer 13 to a three-phase AC power supply 14 which is a grid as a three-phase AC circuit. The DC side of the power converter 1 is connected via an impedance 15 to a DC power supply 16 which is a DC grid.

The power converter 1 includes a leg circuit 4 for each phase. Each leg circuit 4 is formed from a positive arm 5 and a negative arm 6 connected in series at an AC terminal 7 which is a connection point therebetween. The leg circuits 4 for the respective phases are connected in parallel between positive and negative DC buses 2 and 3, and the AC terminals 7 are connected to AC lines for the respective phases.

The positive arm 5 and the negative arm 6 of each leg circuit 4 are respectively formed from cell groups 5a, 6a each having one or more converter cells 10 connected in series. A positive reactor 9p is connected in series to the positive arm 5, and a negative reactor 9n is connected in series to the negative arm 6a. In this case, the positive reactor 9p and the negative reactor 9n are connected on the AC terminal 7 sides of the positive and negative arms 5, 6, thus forming a reactor 8 having three terminals.

The positive reactor 9p and the negative reactor 9n may be different in reactance.

The control device 20 includes a voltage command generation unit 21 for generating a positive arm voltage command Vp+ and a negative arm voltage command Vp−, and a PWM circuit 22, and thereby generates a gate signal 22a. Each converter cell 10 in the positive arm 5 and the negative arm 6 for each phase is controlled by the generated gate signal 22a.

Positive arm current ip+ and negative arm current ip− flowing through the positive arm 5 and the negative arm 6 for each phase, and AC current ip flowing through the AC line for each phase, are detected by current detectors (not shown), and then inputted to the control device 20.

Further, voltage (hereinafter, referred to as AC voltage Vsp) for each phase of the AC power supply 14 detected by a voltage detector (not shown), neutral point voltage Vsn of the power converter 1, and a command value (hereinafter, referred to as a DC voltage command Vdc) for voltage of the DC power supply 16 which is voltage between the positive and negative DC buses 2, 3, are inputted to the control device 20.

The AC current ip for each phase may be used by being calculated from the positive arm current ip+ and the negative arm current ip− respectively flowing through the positive arm 5 and the negative arm 6 for each phase.

In the control device 20, a voltage command generation unit 21 generates the positive arm voltage command Vp+ for the positive arm 5 for each phase and the negative arm voltage command Vp− for the negative arm 6 for each phase, on the basis of the inputted voltage-and-current information. Then, the PWM circuit 22 generates the gate signal 22a by pulse width modulation control (PWM control) on the basis of the positive arm voltage command Vp+ and the negative arm voltage command Vp−.

The details of the configuration and operation of the control device 20 for generating the positive arm voltage command Vp+ and the negative arm voltage command Vp− will be described later.

Figure 2:
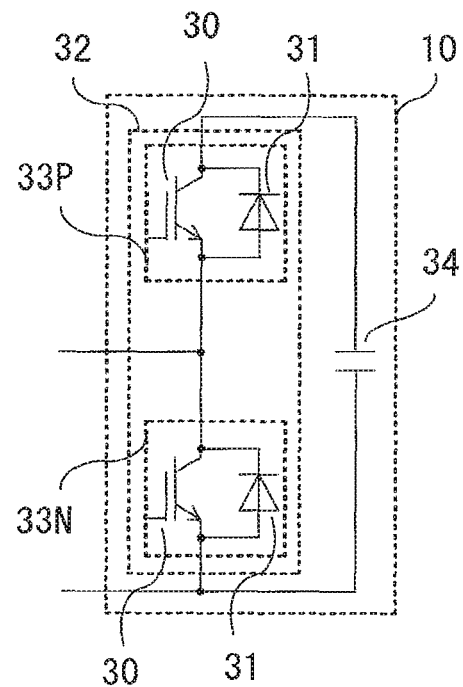
FIG. 2 is a circuit configuration diagram showing an example of a converter cell in the power conversion device according to embodiment 1 of the present invention.

FIG. 2 shows a configuration example of each converter cell 10.

FIG. 2 is a circuit configuration diagram of the converter cell 10 in which a half-bridge configuration is employed.

The converter cell 10 in FIG. 2 is composed of: a series unit 32 including a plurality of (in this case, two) semiconductor switching elements 30 (hereinafter, simply referred to as switching elements) to which diodes 31 are respectively connected in antiparallel; and a DC capacitor 34 connected in parallel to the series unit 32 and for smoothing DC voltage.

Each switching element 30 is formed of a self-turn-off switching element such as an IGBT (Insulated Gate Bipolar Transistor) or a GCT (Gate Commutated Turn-off thyristor). The diode 31 is connected in antiparallel to each switching element 30, thus forming a switch 33P, 33N.

As shown in FIG. 2, in the converter cell 10, both terminals of the switching element 30 of the switch 33N are used as output ends, and through ON/OFF control of the switching element 30, both-end voltage of the DC capacitor 34 and zero voltage are outputted from the output ends.

Figure 3:
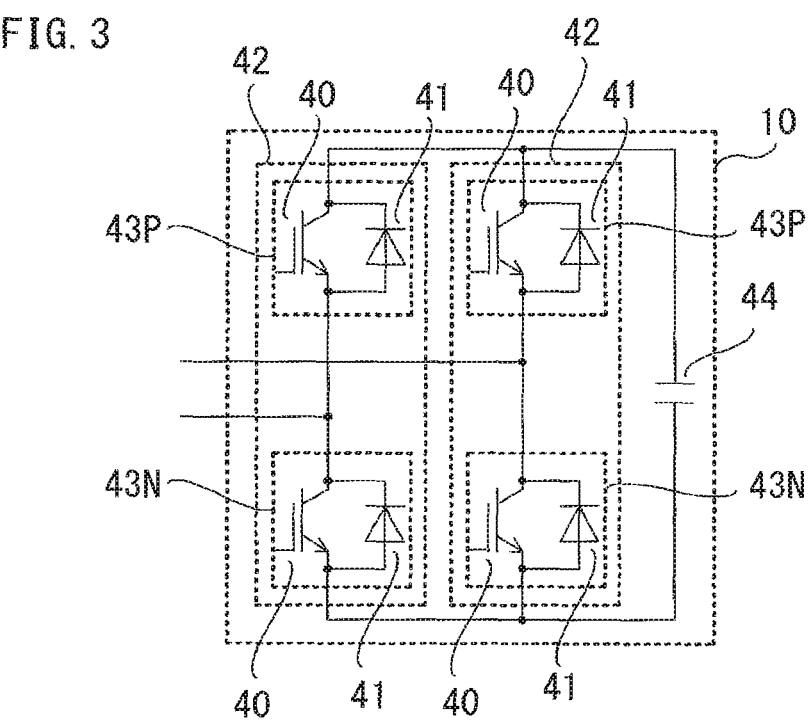
FIG. 3 is a circuit configuration diagram showing another example of a converter cell in the power conversion device according to embodiment 1 of the present invention.

FIG. 3 shows another example of the configuration of each converter cell 10.

FIG. 3 is a circuit configuration diagram showing the converter cell 10 in which a full-bridge configuration is employed.

The converter cell 10 in FIG. 3 is composed of: two series units 42 connected in parallel; and a DC capacitor 44 connected in parallel to the series units 42 and for smoothing DC voltage.

Each series unit 42 is composed of a plurality of (in this case, two) switching elements 40 connected in series, to which diodes 41 are respectively connected in antiparallel.

Each switching element 40 is formed of a self-turn-off switching element such as an IGBT or a GCT. The diode 41 is connected in antiparallel to each switching element 40, thus forming a switch 43P, 43N.

As shown in FIG. 3, in the converter cell 10, terminals of the switching elements 40 that are the intermediate connection points of the respective series units 42 are used as output ends, and through ON/OFF control of the switching elements 40, positive voltage and negative voltage at both ends of the DC capacitor 44 and zero voltage are outputted from the output ends.

The converter cell 10 is not limited to the configurations shown in FIG. 2 and FIG. 3 as long as the converter cell 10 is composed of a series unit including a plurality of switching elements, and a DC capacitor connected in parallel to the series unit, and selectively outputs voltage of the DC capacitor through switching operation.

Since the power converter 1 performs DC output and AC output, the power converter 1 needs to be controlled both on the DC side and the AC side. Further, circulating current izp which circulates among the positive arms 5 and the negative arms 6 without contributing to the AC-side output or the DC-side output flows in the power converter 1. Therefore, it is necessary to control the circulating current izp in addition to the DC-side control and the AC-side control. In this case, since the AC terminals 7 are interconnected with the AC power supply 14 of the grid, it is necessary to output AC voltage needed for the AC-side control, from the power converter 1, and control is performed by feeding forward the AC voltage Vsp for each phase at the AC interconnection point.

Figure 4:
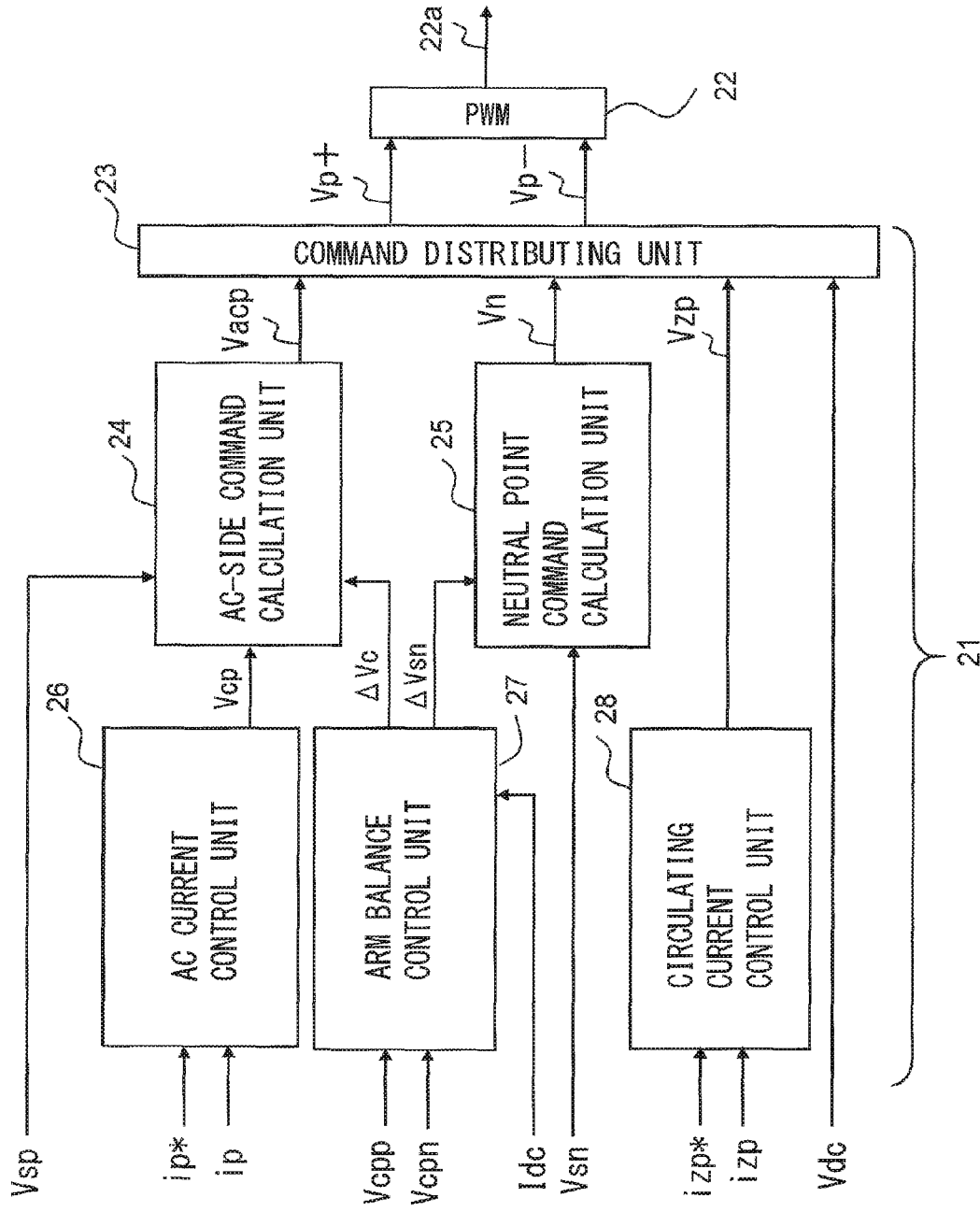
FIG. 4 is a block diagram showing a configuration example of a control device in the power conversion device according to embodiment 1 of the present invention.

FIG. 4 is a block diagram showing a configuration example of the control device 20 in the power conversion device 100 according to embodiment 1 of the present invention.

The control device 20 includes the voltage command generation unit 21 and the PWM circuit 22 as described above.

The voltage command generation unit 21 includes: an AC current control unit 26 for controlling AC current ip; an arm balance control unit 27 for suppressing variation between voltage (hereinafter, referred to as positive capacitor voltage Vcpp) of the DC capacitors 34 (44) in the positive arm 5 and voltage (hereinafter, referred to as negative capacitor voltage Vcpn) of the DC capacitors 34 (44) in the negative arm 6; a circulating current control unit 28 for controlling the circulating current izp for each phase which circulates in the power converter 1; an AC-side command calculation unit 24 for calculating an AC voltage command Vacp; a neutral point command calculation unit 25 for calculating a neutral point voltage command Vn; and a command distributing unit 23 for determining the positive arm voltage command Vp+ and the negative arm voltage command Vp− for each phase.

The AC current control unit 26 calculates an AC control command Vcp which is a voltage command so that a deviation between the detected AC current ip and a set AC current command ip* becomes zero. That is, the AC current control unit 26 calculates the AC control command Vcp for controlling the AC current ip flowing through the AC line for each phase so as to follow the AC current command ip*.

The circulating current control unit 28 calculates a circulation control command Vzp for controlling the circulating current izp for each phase so as to follow a set circulating current command value izp* (for example, zero).

In this case, for each phase, the arm balance control unit 27 uses an average value of detected voltages of all the DC capacitors 34 (44) in the positive arm 5, as the positive capacitor voltage Vcpp, and an average value of detected voltages of all the DC capacitors 34 (44) in the negative arm 6, as the negative capacitor voltage Vcpn.

Then, the arm balance control unit 27 calculates a first voltage adjustment value ΔVc which is an AC-side voltage adjustment value, and a second voltage adjustment value ΔVsn which is a neutral point voltage adjustment value for adjusting the neutral point voltage Vsn, in order to balance the positive capacitor voltage Vcpp and the negative capacitor voltage Vcpn and suppress voltage variation between the positive arm 5 and the negative arm 6.

The AC-side command calculation unit 24 adjusts the AC control command Vcp calculated by the AC current control unit 26, using the first voltage adjustment value ΔVc calculated by the arm balance control unit 27.

Further, the AC-side command calculation unit 24 calculates the AC voltage command Vacp for AC voltage to be outputted to the AC line for each phase, using the AC voltage Vsp for each phase which is fed forward.

The neutral point command calculation unit 25 calculates the neutral point voltage command Vn, on the basis of the second voltage adjustment value ΔVsn calculated by the arm balance control unit 27, and the detected neutral point voltage Vsn.

The AC voltage command Vacp, the neutral point voltage command Vn, the circulation control command Vzp, and the DC voltage command Vdc for voltage between the positive and negative DC buses 2, 3 are inputted to the command distributing unit 23.

On the basis of the above inputted information, the command distributing unit 23 subtracts voltage drop portions due to inductance components in the positive arm 5 and the negative arm 6 from respective voltages assigned as outputs of the positive arm 5 and the negative arm 6, thus distributing voltage components.

Thereby, the command distributing unit 23 determines the positive arm voltage command Vp+ for the positive arm 5 for each phase and the negative arm voltage command Vp− for the negative arm 6 for each phase.

The positive arm voltage command Vp+ and the negative arm voltage command Vp− for each phase thus generated by the voltage command generation unit 21 become output voltage commands for controlling voltage of the DC power supply 16 to be the DC voltage command Vdc, controlling the AC voltage to be the AC voltage command Vacp, and controlling the neutral point voltage to be the neutral point voltage command Vn.

The neutral point voltage Vsn may be a value calculated from voltage of the DC power supply 16, or may be a detected value. The DC voltage command Vdc may be provided by DC output control, or may be a constant value.

The PWM circuit 22 generates the gate signal 22a to perform PWM control for each converter cell 10 in the positive arm 5 and the negative arm 6 for each phase, on the basis of the positive arm voltage command Vp+ and the negative arm voltage command Vp−.

By the generated gate signal 22a, the switching element 30 (40) in each converter cell 10 is drive-controlled, so that output voltage of the power converter 1 is controlled to be a desired value.

Hereinafter, the details of the arm balance control unit 27, as a major part of the present embodiment, for suppressing variation between the positive capacitor voltage Vcpp and the negative capacitor voltage Vcpn will be described.

Figure 5:
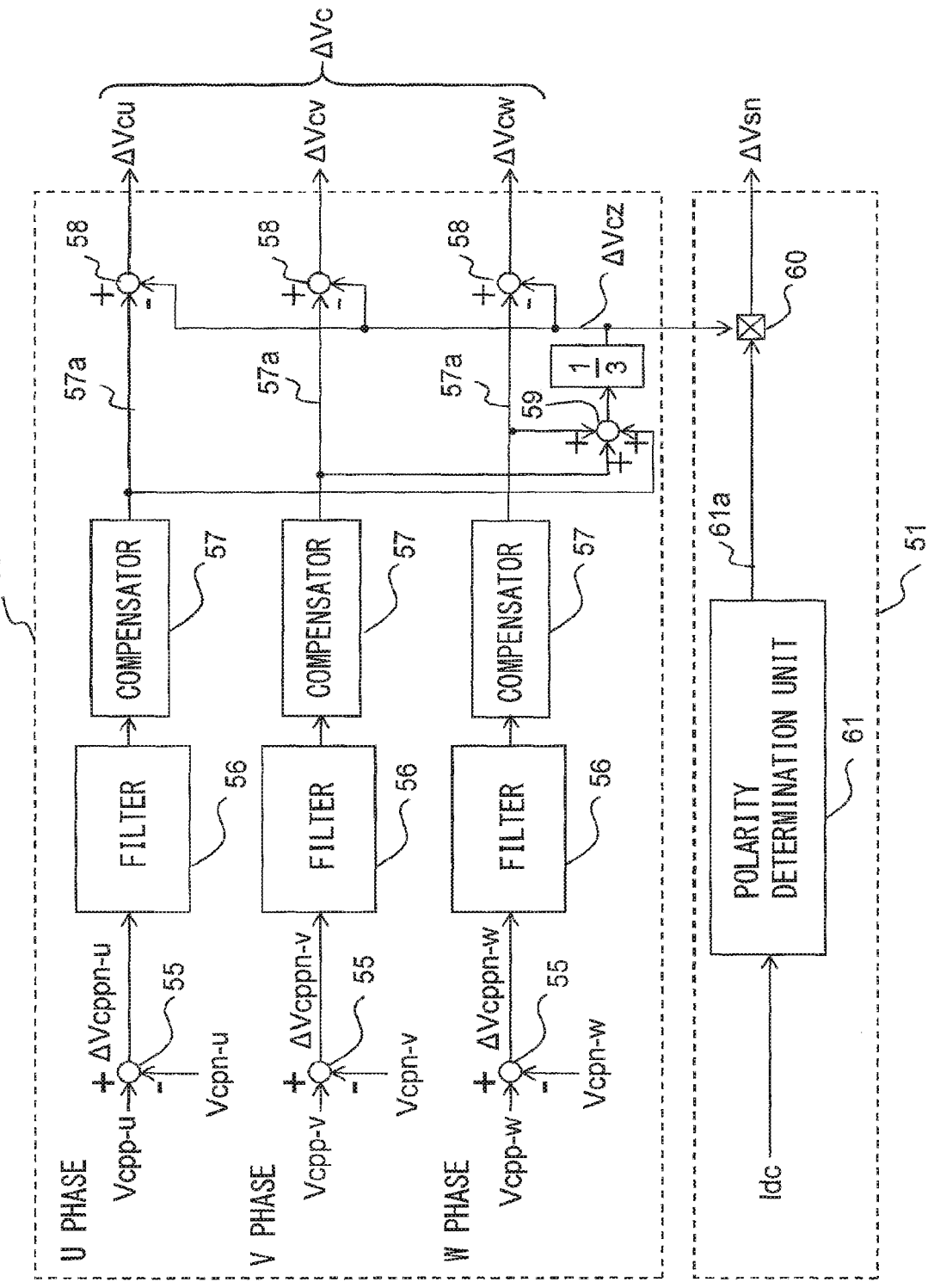
FIG. 5 is a block diagram showing a detailed configuration of an arm balance control unit according to embodiment 1 of the present invention.

FIG. 5 is a block diagram showing a detailed configuration of the arm balance control unit 27 according to embodiment 1 of the present invention.

The arm balance control unit 27 includes an AC-side adjustment value calculation unit 50 for calculating the first voltage adjustment value ΔVc, and a neutral point adjustment value calculation unit 51 for calculating the second voltage adjustment value ΔVsn.

First, the calculation method by the AC-side adjustment value calculation unit 50 will be described.

As shown in FIG. 5, the AC-side adjustment value calculation unit 50 is configured to calculate the first voltage adjustment value ΔVc (ΔVcu, ΔVcv, ΔVcw) individually for each of U phase, V phase, and W phase. The calculation method for the first voltage adjustment value ΔVc, described below, is the same among the phases.

First, a subtractor 55 calculates ΔVcppn (ΔVcppn-u, ΔVcppn-v, ΔVcppn-w) which is a difference between the detected positive capacitor voltage Vcpp (Vcpp-u, Vcpp-v, Vcpp-w) and the detected negative capacitor voltage Vcpn (Vcpn-u, Vcpn-v, Vcpn-w).

Next, a filter 56 removes a specific frequency component from ΔVcppn. That is, ΔVcppn which is a voltage difference between the positive capacitor voltage Vcpp and the negative capacitor voltage Vcpn includes a fundamental wave frequency component and a frequency component twice as high as the fundamental wave frequency. Such specific frequency components are not control targets, and therefore are removed by the filter 56.

The filter 56 may be, for example, a band-stop filter which removes specific frequency components such as a fundamental wave frequency component or a frequency component twice as high as the fundamental wave frequency. Thus, a filter that allows frequency components in a control target frequency band to pass may be used.

Next, a compensator 57 calculates a voltage adjustment value 57a so that the ΔVcppn from which unnecessary frequency components have been removed as described above becomes zero. The voltage adjustment value 57a is calculated individually for each phase, and therefore includes all components of a positive sequence component, a negative sequence component, and a zero sequence component.

Next, the voltage adjustment values 57a for the respective phases are added by an adder 59 and then multiplied by ⅓, thereby calculating a zero sequence component ΔVcz.

Next, a subtractor 58 subtracts the zero sequence component ΔVcz from the calculated voltage adjustment value 57a for each phase, thereby calculating the first voltage adjustment value ΔVc (ΔVcu, ΔVcv, ΔVcw) for each phase.

The reason for removing the zero sequence component ΔVcz as described above is because the zero sequence component ΔVcz is to be controlled separately, and the details thereof will be described later.

Next, the calculation method by the neutral point adjustment value calculation unit 51 will be described.

First, a polarity determination unit 61 determines the direction of zero sequence current in the positive arm 5 and the negative arm 6, i.e., a polarity 61a, on the basis of DC current Idc.

Next, a multiplier 60 multiplies the zero sequence component ΔVcz calculated by the AC-side adjustment value calculation unit 50, by the polarity 61a of the zero sequence current, thereby calculating the second voltage adjustment value ΔVsn.

The DC current Idc may be directly detected, or may be obtained by calculation.

As described above, the AC-side adjustment value calculation unit 50 calculates, of the voltage adjustment values 57a for the respective phases, ΔVcz which is the zero sequence component, and the first voltage adjustment value ΔVc (ΔVcu, ΔVcv, ΔVcw) from which the zero sequence component ΔVcz has been removed, on the basis of the detected positive capacitor voltage Vcpp for each phase and the detected negative capacitor voltage Vcpn for each phase.

The neutral point adjustment value calculation unit 51 calculates the second voltage adjustment value ΔVsn on the basis of the zero sequence voltage component ΔVcz calculated by the AC-side adjustment value calculation unit 50 and the polarity information (polarity 61a) about the zero sequence current in the positive arm 5 and the negative arm 6.

The control by the arm balance control unit 27 as described above balances the positive capacitor voltage Vcpp and the negative capacitor voltage Vcpn and suppresses voltage variation between the positive arm 5 and the negative arm 6. This will be described below.

First, current components flowing through the power converter 1 will be described.

Since the power converter 1 performs DC output and AC output, main components of current flowing through the power converter 1 are two components of a DC component and an AC fundamental wave component. Therefore, main components of the positive arm current ip+ and the negative arm current ip− are also two components of a DC component and an AC fundamental wave component.

The DC component in the positive arm current ip+ and the DC component in the negative arm current ip− have the same magnitude and the same polarity. The AC fundamental wave component of the positive arm current ip+ and the AC fundamental wave component of the negative arm current ip− have the same magnitude and polarities opposite to each other.

Next, voltage components outputted from the power converter 1 will be described.

Since the power converter 1 performs DC output and AC output, main components of the voltage outputted from the power converter 1 are also two components of a DC component and an AC fundamental wave component. Therefore, main components of voltage outputted from the cell group 5*a* in the positive arm 5 and voltage outputted from the cell group 6*a* in the negative arm 6 are also two components of a DC component and an AC fundamental wave component.

The DC components of voltage outputted from the cell group 5*a* in the positive arm 5 and voltage outputted from the cell group 6*a* in the negative arm 6 have the same magnitude and the same polarity, and their respective AC fundamental wave components have the same magnitude and polarities opposite to each other.

It is assumed that the positive capacitor voltage Vcpp and the negative capacitor voltage Vcpn are in an unbalanced state, for example, the positive capacitor voltage Vcpp is higher than the negative capacitor voltage Vcpn. In this case, the DC capacitors 34 (44) in the positive arm 5 are discharged and the DC capacitors 34 (44) in the negative arm 6 are charged, whereby the positive capacitor voltage Vcpp and the negative capacitor voltage Vcpn can be balanced. That is, the polarities in charging and discharging of the DC capacitors 34 (44) in the positive arm 5 and the DC capacitors 34 (44) in the negative arm 6 need to be opposite to each other.

In order to cause the polarities in charging and discharging of the DC capacitors 34 (44) in the positive arm 5 and the DC capacitors 34 (44) in the negative arm 6 to be opposite to each other, any of the following methods may be used. That is, to the positive arm 5 and the negative arm 6, voltages of AC fundamental wave components may be generated at the same polarity, currents of AC fundamental wave components may be caused to flow at the same polarity, voltages of DC components may be generated at polarities opposite to each other, or currents of DC components may be caused to flow at polarities opposite to each other.

In the present embodiment, the method of generating voltages of DC components at polarities opposite to each other is used, in which the voltage phase at the AC terminal is not needed.

As described above, the AC fundamental wave components of voltages in the positive arm 5 and the negative arm 6 have polarities opposite to each other. Therefore, in order to generate voltages of DC components at polarities opposite to each other, which are needed for balancing the positive capacitor voltage Vcpp and the negative capacitor voltage Vcpn, a DC component adjustment value is provided to the voltage command for AC voltage to be outputted to the AC line for each phase.

As the DC component adjustment value, the first voltage adjustment value ΔVc calculated by the AC-side adjustment value calculation unit 50 of the arm balance control unit 27 is used, and the AC control command Vcp is adjusted by the first voltage adjustment value ΔVc, to calculate the AC voltage command Vacp.

Next, a method in which the neutral point adjustment value calculation unit 51 collectively controls voltage balances between the positive capacitor voltages Vcpp and the negative capacitor voltages Vcpn for all the phases, will be described in detail.

In order to collectively control voltage balances between the positive capacitor voltages Vcpp and the negative capacitor voltages Vcpn for all the phases, the neutral point voltage Vsn (zero sequence voltage) may be adjusted.

Therefore, ΔVcz which is the zero sequence component is calculated from the AC-side voltage adjustment values 57*a* for the respective phases, calculated by the AC-side adjustment value calculation unit 50, and the calculated zero sequence component ΔVcz is used for the second voltage adjustment value ΔVsn as an adjustment value for the neutral point voltage Vsn.

However, the polarity for adjusting the neutral point voltage Vsn depends on the polarity of the zero sequence current, i.e., the polarity 61*a* of the DC current Idc, and therefore, ΔVsn obtained by applying the polarity 61*a* of the DC current Idc to the zero sequence component ΔVcz is used as the second voltage adjustment value ΔVsn.

As described above, for performing control of separately adjusting the neutral point voltage Vsn (zero sequence voltage) using the second voltage adjustment value ΔVsn, the zero sequence component ΔVcz is subtracted from the voltage adjustment value 57*a* described above.

Thus, the first voltage adjustment value ΔVc and the second voltage adjustment value ΔVsn for balancing the positive capacitor voltage Vcpp and the negative capacitor voltage Vcpn are calculated.

Then, the positive arm voltage command Vp+ and the negative arm voltage command Vp− are determined on the basis of the AC voltage command Vacp to which the first voltage adjustment value ΔVc has been provided, and the neutral point voltage command Vn to which the second voltage adjustment value ΔVsn has been provided.

Thus, the switching elements 30 (40) in each converter cell 10 are drive-controlled, and the positive capacitor voltage Vcpp and the negative capacitor voltage Vcpn are balanced.

The power conversion device 100 of the present embodiment configured as described above makes it unnecessary to perform calculation for detecting a phase, and the like, thereby reducing the calculation amount, and can balance the voltage Vcpp of the DC capacitors 34 (44) in the positive arm 5 and the voltage Vcpn of the DC capacitors 34 (44) in the negative arm 6. Thus, overvoltage of the DC capacitors 34 (44) can be prevented and stable operation can be performed even in the case of grid abnormality. In addition, since stable operation can be performed even in the case of grid abnormality as described above, outflow of harmonics can be suppressed, and the power conversion efficiency can be improved.

Further, by using the second voltage adjustment value ΔVsn calculated by the neutral point adjustment value calculation unit 51, it is possible to collectively and easily control voltage balances of the DC capacitors 34 (44) between the positive arms 5 and the negative arms 6 for all the phases.

In addition, the first voltage adjustment value $\Delta Vc$ is calculated for each phase. Therefore, for example, even if the voltage balance between the positive capacitor voltage Vcpp and the negative capacitor voltage Vcpn is different among the phases, it is possible to perform control according to the state of each phase. Thus, the accuracy of the arm balance control is further improved.

In the present embodiment, an average value of detected voltages of the DC capacitors 34 (44) in the positive arm 5 and an average value of detected voltages of the DC capacitors 34 (44) in the negative arm 6 are used as the positive capacitor voltage Vcpp and the negative capacitor voltage Vcpn, respectively.

However, without limitation to the average values, voltages of the DC capacitors 34 (44) arbitrarily selected may be used, for example.

The positive reactor $9p$ and the negative reactor $9n$ may be respectively provided at any positions in the positive arm 5 and the negative arm 6, and a plurality of such reactors may be provided in each arm. Alternatively, the reactor may be provided in only one of the positive arm 5 and the negative arm 6.

Figure 6:
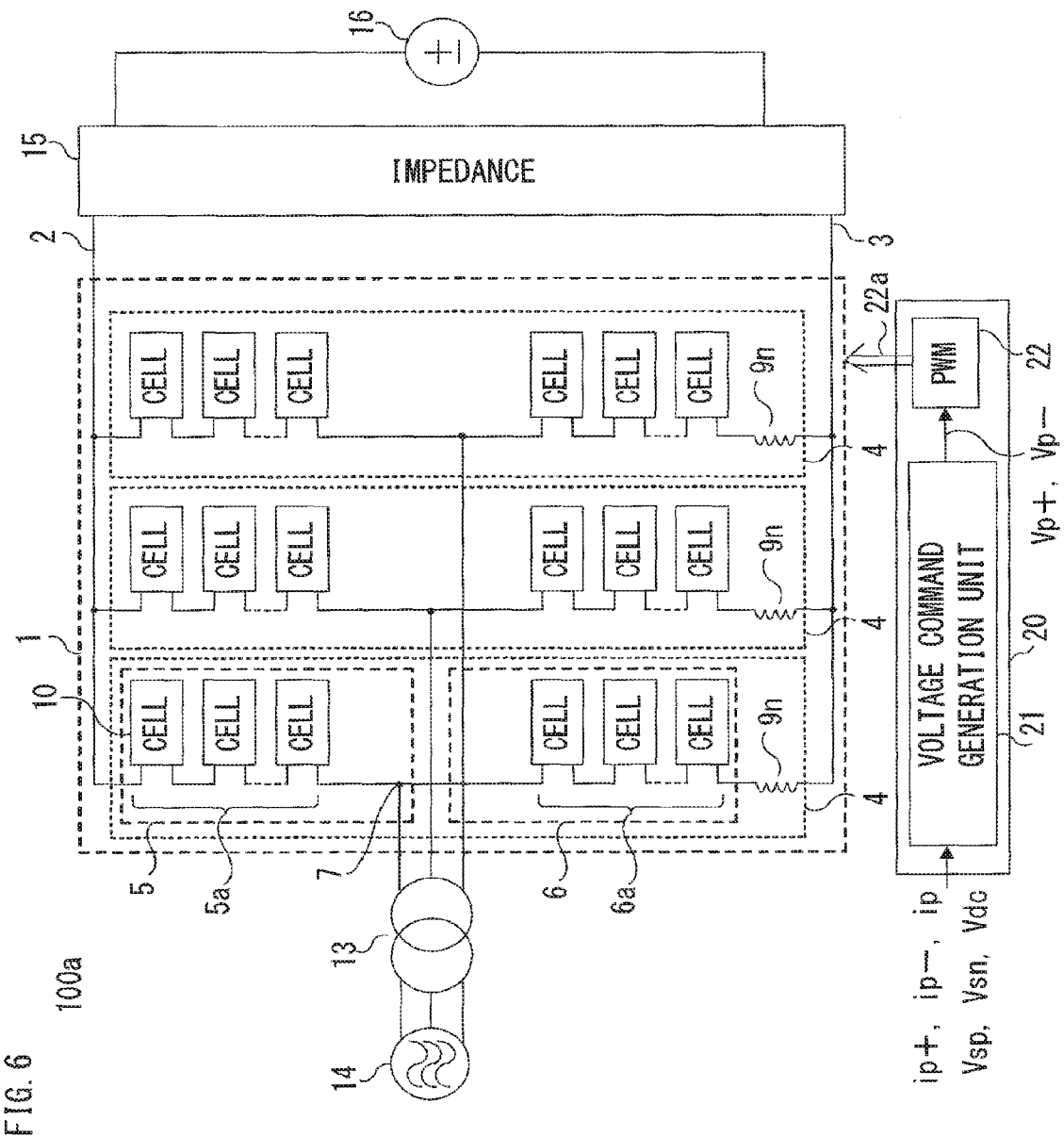
FIG. 6 is a schematic configuration diagram showing another configuration of the power conversion device according to embodiment 1 of the present invention.

FIG. 6 is a schematic configuration diagram showing a power conversion device 100a having another configuration in embodiment 1 of the present invention.

As shown in FIG. 6, only in the negative arm 6, the negative reactor $9n$ may be provided in series on the negative side of the cell group 6a.

In the power conversion device 100 shown in FIG. 1, the AC terminal 7 which is the connection point between the positive arm 5 and the negative arm 6 is connected to the AC line for each phase, whereby power is transferred to and from the three-phase AC power supply 14, but the configuration is not limited thereto.

For example, the following configuration may be employed: the positive arm 5 and the negative arm 6 are connected in series and then connected via a transformer to the AC line for each phase, whereby power is transferred to and from the three-phase AC power supply 14.

The power conversion device 100 shown above is configured such that the arm balance control unit 27 includes the AC-side adjustment value calculation unit 50 for calculating the first voltage adjustment value $\Delta Vc$, and the neutral point adjustment value calculation unit 51 for calculating the second voltage adjustment value $\Delta Vsn$. However, without limitation thereto, the arm balance control unit 27 may include only the AC-side adjustment value calculation unit 50. In this case, the neutral point command calculation unit 25 calculates the neutral point voltage command Vn on the basis of only the detected neutral point voltage Vsn without using the second voltage adjustment value $\Delta Vsn$.

Embodiment 2

Hereinafter, with reference to the drawings, embodiment 2 of the present invention will be described focusing on a part different from the above embodiment 1. The same components as those in the above embodiment 1 are denoted by the same reference characters, and the description thereof is omitted.

Figure 7:
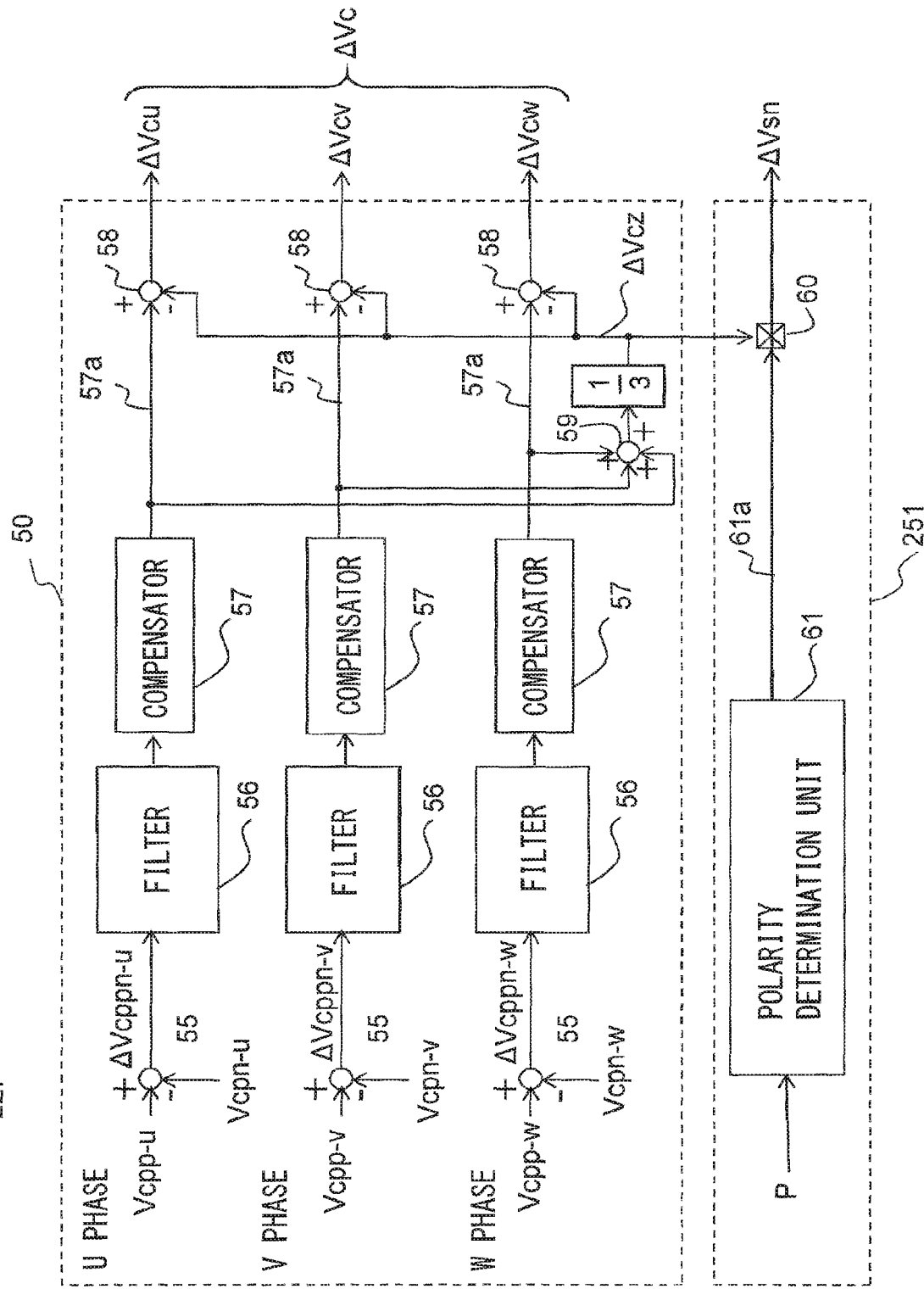
FIG. 7 is a block diagram showing a detailed configuration of an arm balance control unit according to embodiment 2 of the present invention.

FIG. 7 is a block diagram showing the detailed configuration of an arm balance control unit 227 according to embodiment 2 of the present invention.

The present embodiment and embodiment 1 are different in that, in embodiment 1, the polarity 61a of the zero sequence current in the positive arm 5 and the negative arm 6 is determined from the DC current Idc, whereas, in the present embodiment, the polarity 61a of the zero sequence current in the positive arm 5 and the negative arm 6 is determined and detected from active power P.

First, in the polarity determination unit 61, the direction of the zero sequence current in the positive arm 5 and the negative arm 6, i.e., the polarity 61a, is determined from the active power P.

Next, the multiplier 60 multiplies the zero sequence component $\Delta Vcz$ calculated by the AC-side adjustment value calculation unit 50, by the polarity 61a of the zero sequence current, thereby calculating the second voltage adjustment value $\Delta Vsn$.

Here, the active power P may be AC-side output power or may be DC-side output power.

The power conversion device 100 of the present embodiment configured as described above provides the same effect as in embodiment 1, that is, makes it unnecessary to perform calculation for detecting a phase, and the like, thereby reducing the calculation amount, and can balance the voltage Vcpp of the DC capacitors 34 (44) in the positive arm 5 and the voltage Vcpn of the DC capacitors 34 (44) in the negative arm 6. Thus, overvoltage of the DC capacitors 34 (44) can be prevented and stable operation can be performed even in the case of grid abnormality. In addition, since stable operation can be performed even in the case of grid abnormality as described above, outflow of harmonics can be suppressed, and the power conversion efficiency can be improved.

Embodiment 3

Hereinafter, with reference to the drawings, embodiment 3 of the present invention will be described focusing on a part different from the above embodiment 1. The same components as those in the above embodiment 1 are denoted by the same reference characters, and the description thereof is omitted.

Figure 8:
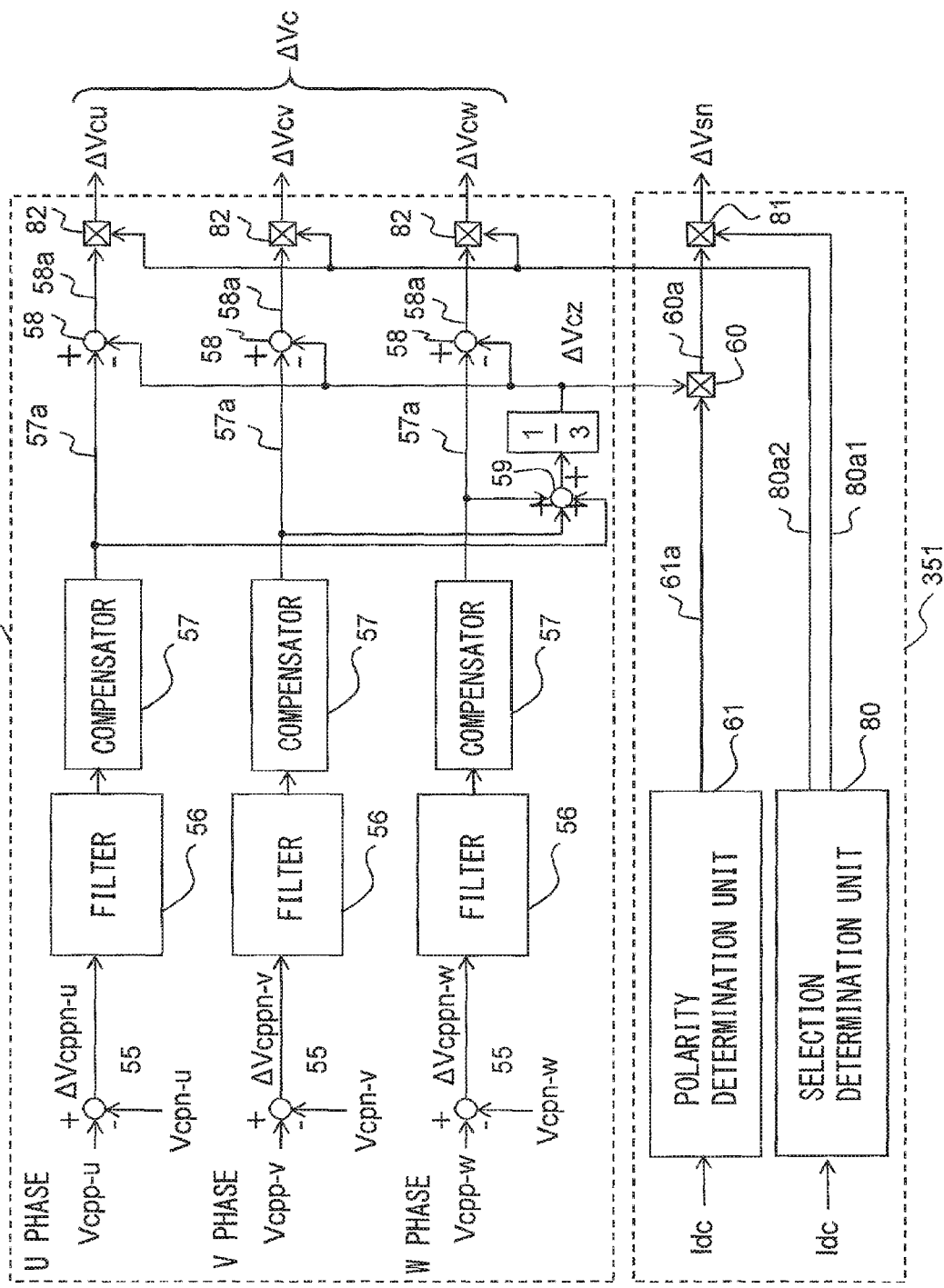
FIG. 8 is a block diagram showing a detailed configuration of an arm balance control unit according to embodiment 3 of the present invention.

FIG. 8 is a block diagram showing the detailed configuration of an arm balance control unit 327 according to embodiment 3 of the present invention.

A neutral point adjustment value calculation unit 351 according to the present embodiment includes a selection determination unit 80 for comparing the magnitude of the DC current Idc flowing through the power converter 1 with a set threshold value.

If the magnitude of the DC current Idc is equal to or smaller than the threshold value, the selection determination unit 80 outputs "0" as determination information 80a1, and outputs "1" as determination information 80a2.

A multiplier 81 multiplies an output 60a of the multiplier 60 by the determination information 80a1. In this case, since the determination information 80a1 is 0, the second voltage adjustment value $\Delta Vsn$ outputted from the multiplier 81 becomes 0 and thus is not effective.

The multiplier 82 multiplies an output 58a of the subtractor 58 by the determination information 80a2. In this case, since the determination information 80a2 is 1, the first voltage adjustment value $\Delta Vc$ outputted from the multiplier 82 is effective.

Then, the neutral point command calculation unit 25 calculates the neutral point voltage command Vn on the basis of only the detected neutral point voltage Vsn without using the second voltage adjustment value $\Delta Vsn$.

On the other hand, as in embodiments 1, 2, the AC-side command calculation unit 24 adjusts the AC control command Vcp by the first voltage adjustment value ΔVc, thereby calculating the AC voltage command Vacp.

That is, the arm balance control is performed using only the first voltage adjustment value ΔVc without performing adjustment using the second voltage adjustment value ΔVsn.

If the magnitude of the DC current Idc is greater than the threshold value, the selection determination unit 80 outputs "1" as the determination information 80a1, and outputs "0" as the determination information 80a2.

In this case, since the determination information 80a1 is 1, the second voltage adjustment value ΔVsn is effective, and since the determination information 80a2 is 0, the first voltage adjustment value ΔVc is not effective.

Then, the AC-side command calculation unit 24 calculates the AC voltage command Vacp without performing adjustment using the first voltage adjustment value ΔVc for the AC control command Vcp.

On the other hand, as in embodiments 1, 2, the neutral point command calculation unit 25 calculates the neutral point voltage command Vn on the basis of the second voltage adjustment value ΔVsn and the detected neutral point voltage Vsn.

That is, the arm balance control can be performed using only the second voltage adjustment value ΔVsn without performing adjustment using the first voltage adjustment value ΔVc.

Thus, the control is performed such that the second voltage adjustment value ΔVsn is set to be not effective when the magnitude of the DC current Idc flowing through the power converter 1 is equal to or smaller than the threshold value.

That is, normally, the neutral point adjustment value calculation unit 51 calculates the second voltage adjustment value ΔVsn using the DC current Idc, and this calculation is effective only when current is flowing through the power conversion device 100. Therefore, in the case where the value of the DC current Idc is such a small value that is equal to or smaller than the threshold value, there is a possibility that the second voltage adjustment value ΔVsn cannot be normally calculated, and thus the control is performed without using the second voltage adjustment value ΔVsn.

On the other hand, the first voltage adjustment value ΔV is not a value calculated using the DC current Idc. Therefore, even if the DC current Idc is small, there is no problem in calculating the first voltage adjustment value ΔV, and the AC-side command calculation unit 24 performs calculation using the first voltage adjustment value ΔVc.

In the above description, in the case where the magnitude of the DC current Idc is greater than the threshold value, only the second voltage adjustment value ΔVsn is set to be effective, and the first voltage adjustment value ΔVc is set to be not effective. However, without limitation thereto, both the first voltage adjustment value ΔVc and the second voltage adjustment value ΔVsn may be set to be effective, to perform control using both the first voltage adjustment value ΔVc and the second voltage adjustment value ΔVsn, as in embodiment 1.

In the above description, the control in which the magnitude of the DC current Idc is compared with the threshold value has been shown. However, comparison and determination may be performed using the magnitude of the active power P.

The power conversion device 100 of the present embodiment configured as described above provides the same effect as in embodiments 1, 2, that is, makes it unnecessary to perform calculation for detecting a phase, and the like, thereby reducing the calculation amount, and can balance the voltage Vcpp of the DC capacitors 34 (44) in the positive arm 5 and the voltage Vcpn of the DC capacitors 34 (44) in the negative arm 6. Thus, overvoltage of the DC capacitors 34 (44) can be prevented and stable operation can be performed even in the case of grid abnormality. In addition, since stable operation can be performed even in the case of grid abnormality as described above, outflow of harmonics can be suppressed, and the power conversion efficiency can be improved.

Further, even if the magnitude of the active power P or the DC current Idc flowing through the power converter 1 is small, stable arm balance control can be provided.

It is noted that, within the scope of the present invention, the above embodiments may be freely combined with each other, or each of the above embodiments may be modified or simplified as appropriate.

The invention claimed is:

1. A power conversion device comprising:
  a power converter for performing power conversion between three-phase AC and DC, the power converter including a plurality of leg circuits each having a positive arm and a negative arm which are connected in series and are connected to an AC line for each phase, the plurality of leg circuits being connected in parallel between positive and negative DC buses; and
  a control device for controlling the power converter, wherein
  each of the positive arm and the negative arm of each leg circuit includes a converter cell composed of: a series unit including a plurality of semiconductor switching elements connected in series to each other; and a DC capacitor connected in parallel to the series unit,
  the control device includes a voltage command generation unit for generating a positive arm voltage command for the positive arm and a negative arm voltage command for the negative arm, and performs output control of each converter cell in the positive arm and the negative arm by PWM control,
  the voltage command generation unit includes:
    an AC current control unit for calculating an AC control command for controlling an AC current component flowing through the AC line for each phase;
    an arm balance control unit for, on the basis of positive capacitor voltage which is voltage of the DC capacitor in the positive arm and negative capacitor voltage which is voltage of the DC capacitor in the negative arm, calculating a first voltage adjustment value for balancing the positive capacitor voltage and the negative capacitor voltage;
    an AC-side command calculation unit for outputting an AC voltage command for AC voltage to be outputted to the AC line for each phase; and
    a command distributing unit for determining the positive arm voltage command and the negative arm voltage command on the basis of the AC voltage command and a DC voltage command for DC voltage between the DC buses, and
  the AC-side command calculation unit calculates the AC voltage command by adjusting the AC control command using the first voltage adjustment value.

2. The power conversion device according to claim 1, wherein
  each of the positive arm and the negative arm includes a plurality of the converter cells connected in series.

3. The power conversion device according to claim 1, wherein
the voltage command generation unit includes a neutral point command calculation unit for outputting a neutral point voltage command for controlling neutral point voltage,
the arm balance control unit calculates a second voltage adjustment value for adjusting the neutral point voltage, on the basis of the positive capacitor voltage and the negative capacitor voltage,
the neutral point command calculation unit calculates the neutral point voltage command on the basis of the second voltage adjustment value and the neutral point voltage that is detected, and
the command distributing unit determines the positive arm voltage command and the negative arm voltage command on the basis of the AC voltage command, the DC voltage command, and further, the neutral point voltage command.

4. The power conversion device according to claim 1, wherein
the first voltage adjustment value is a value calculated by removing a zero sequence component.

5. The power conversion device according to claim 1, wherein
the arm balance control unit calculates a zero sequence component from a calculation result of performing such calculation as to reduce a voltage difference between the positive capacitor voltage and the negative capacitor voltage, and subtracts the zero sequence component from the calculation result, thereby calculating the first voltage adjustment value.

6. The power conversion device according to claim 3, wherein
the arm balance control unit calculates the second voltage adjustment value on the basis of the positive capacitor voltage, the negative capacitor voltage, and further, polarity information about zero sequence current in the positive arm and the negative arm.

7. The power conversion device according to claim 6, wherein
the arm balance control unit determines, as the polarity information, a polarity of at least one of active power and DC current flowing through the power converter, calculates a zero sequence component from a calculation result of performing such calculation as to reduce a voltage difference between the positive capacitor voltage and the negative capacitor voltage, and multiplies the zero sequence component by the polarity information, thereby calculating the second voltage adjustment value.

8. The power conversion device according to claim 3, wherein
the neutral point command calculation unit calculates the neutral point voltage command on the basis of only the neutral point voltage that is detected, without using the second voltage adjustment value, when a magnitude of at least one of active power and DC current flowing through the power converter is equal to or smaller than a corresponding one of threshold values respectively set for the active power and DC current.

9. The power conversion device according to claim 3, wherein
the AC-side command calculation unit calculates the AC voltage command without adjusting the AC control command using the first voltage adjustment value, when a magnitude of at least one of active power and DC current flowing through the power converter is greater than a corresponding one of threshold values respectively set for the active power and DC current.

10. The power conversion device according to claim 1, wherein
the arm balance control unit calculates the first voltage adjustment value for each phase.

11. The power conversion device according to claim 1, wherein
the voltage command generation unit includes a circulating current control unit for generating a circulation control command for controlling a circulating current component for each phase which circulates among the leg circuits, and
the command distributing unit determines the positive arm voltage command and the negative arm voltage command on the basis of the AC voltage command, the DC voltage command, and further, the circulation control command.

12. The power conversion device according to claim 1, wherein
a reactor is connected in series to one of the positive arm and the negative arm in each leg circuit.

13. The power conversion device according to claim 1, wherein
reactors that are different in reactance are respectively connected in series to the positive arm and the negative arm in each leg circuit.

14. The power conversion device according to claim 1, wherein
the positive capacitor voltage and the negative capacitor voltage are an average value of voltages of the DC capacitors in the positive arm and an average value of voltages of the DC capacitors in the negative arm, respectively.

15. The power conversion device according to claim 2, wherein
the voltage command generation unit includes a neutral point command calculation unit for outputting a neutral point voltage command for controlling neutral point voltage,
the arm balance control unit calculates a second voltage adjustment value for adjusting the neutral point voltage, on the basis of the positive capacitor voltage and the negative capacitor voltage,
the neutral point command calculation unit calculates the neutral point voltage command on the basis of the second voltage adjustment value and the neutral point voltage that is detected, and
the command distributing unit determines the positive arm voltage command and the negative arm voltage command on the basis of the AC voltage command, the DC voltage command, and further, the neutral point voltage command.

16. The power conversion device according to claim 3, wherein
the first voltage adjustment value is a value calculated by removing a zero sequence component.

17. The power conversion device according to claim 3, wherein
the arm balance control unit calculates a zero sequence component from a calculation result of performing such calculation as to reduce a voltage difference between the positive capacitor voltage and the negative capacitor voltage, and subtracts the zero sequence component from the calculation result, thereby calculating the first voltage adjustment value.

18. The power conversion device according to claim 8, wherein
the AC-side command calculation unit calculates the AC voltage command without adjusting the AC control command using the first voltage adjustment value, when a magnitude of at least one of active power and DC current flowing through the power converter is greater than a corresponding one of threshold values respectively set for the active power and DC current.

* * * * *